United States Patent
Chen

(10) Patent No.: US 6,817,811 B1
(45) Date of Patent: Nov. 16, 2004

(54) CONSTRUCTION FOR ENVIRONMENTAL PROTECTION IN RESPECT OF WATER SOURCE AND EARTH

(76) Inventor: Jui Wen Chen, P.O. Box 82 144, Taipei (TW)

( * ) Notice: Subject to any disclaimer, the term of this patent is extended or adjusted under 35 U.S.C. 154(b) by 0 days.

(21) Appl. No.: 10/651,964

(22) Filed: Sep. 2, 2003

(51) Int. Cl.⁷ .............................................. E02D 29/02
(52) U.S. Cl. ........................ 405/287; 405/284; 405/286; 405/302.6
(58) Field of Search ................................ 405/287, 286, 405/285, 284, 302.6, 302.7, 302.4

(56) References Cited

U.S. PATENT DOCUMENTS

| | | | | |
|---|---|---|---|---|
| 4,557,634 A | * | 12/1985 | Vidal | 405/286 |
| 4,992,003 A | * | 2/1991 | Perach | 405/302.7 |
| 5,564,865 A | * | 10/1996 | Jansson | 405/286 |
| 6,494,009 B1 | * | 12/2002 | Kang | 405/285 |

FOREIGN PATENT DOCUMENTS

JP          5-98656     *  4/1993    ................. 405/286

* cited by examiner

Primary Examiner—Frederick L. Lagman
(74) Attorney, Agent, or Firm—Leong C. Lei

(57) ABSTRACT

A construction for environmental protection in respect of water source and earth, including combining water ducts, planting cases, connecting meshes and lower moldboards to form framework for paving the hillsides. The end of the water duct is buried in the soil, whereas the frames can connect with each other and be hammered along with earth anchors into the rock walls for fastening purposes. Frames can be covered by mold panels and padded by moldboards to be fastened to the hillsides before grouting with liquid concrete to form hard walls. In the case of trench walls, hillsides, or any ramp, planting cases containing soil can be used for weeds to grow naturally, in order to prevent mudflow and landslide, create a beautiful greening landscape, and maintain the environment protection, as well as reduce the greenhouse effect.

16 Claims, 20 Drawing Sheets

CONSTRUCTION FOR ENVIRONMENTAL PROTECTION IN RESPECT OF WATER SOURCE AND EARTH

BACKGROUND OF THE INVENTION (a) Technical Field of the Invention

The present invention relates to a construction for environmental protection in respect of water source and earth, the design of which has advantages of enhancing drainage function of the hillside, as well as creating a natural environment. Although the artificial hillsides are built by concrete, the outer appearance can derive to natural grass hillsides full of the value of environmental protection.

(b) Brief Description of the Prior Art

Prior arts relating to construction materials for maintenance of water source and earth include the following patents:

R.O.C. Patent No. 465616 is titled "Multi-apertured boards and pipes for preventing mudflow", characterized in heat squeezing and then instantly cooling of heat-plastic macromolecular plastic material to form a plurality of irregular loops, which are piled on and wind around one another to form flat and long board or cylinder with multiple apertures, thereby the flat and long board or cylinder can be used alone or one by another for paving on or burring in the earth or macadam hillside, ground, etc. for the purposes of consolidation and drainage of water accumulated on the ground or the underground water, as well as preventing mudflow and landslide.

However, there yet exist some disadvantages in the above-mentioned patent, i.e. as the diameter of the cylinders is too big, rendering the cylinders cannot be arranged closely, otherwise the mud and macadam of the hillsides would flow away or become softened. Accordingly, it is improper to plant a lot of weeds on the hillsides for greening purposes.

R.O.C. Approval No. 222798 is titled "Gravity retaining wall improved drainage structure", the design of retaining water source and earth is composed of a water collector and a water-collecting panel, which can drain away the surplus water contained in the hillside soil. However, the outer appearance presents a plurality of water outlets, and thus is not conform to the requirements of beautiful feeling and natural environment.

R.O.C. Approval No. 465612, also disclosed by the inventor of the present invention, is titled "Water duct structure in environmental and permeable concrete paving", which has the design successfully forming a permeable paving on the ground. However, when applying the disclosure to the hillsides with inclination or vertical retaining walls, though the surplus water can be drained out to maintain the earth, it is unlikely to form natural grassland. While weeds not only can provide a place for fowls to rest and breed, but also can serve the function of environmental protection and maintenance of the water source and earth, the inventor considered it necessary to further improved this disclosure.

Primarily, the afore-mentioned prior arts contain a concrete board to serve as the permeable paving for the drainage system of the retaining walls. The surface of the concrete structures is dull and factitious, especially when applying to the hillsides, it is quite inharmonious with the natural trees and grass. In view of the necessity of re-building the natural environment after being ruined by human construction, it should be taken into consider the environmental protection and aesthetic feeling.

Accordingly, the inventor has designed a construction of permeable paving walls, which is applicable to hillsides with inclination or vertical walls, and has the function of environmental protection in respect of water source and earth, as well as enriches with aesthetic feeling at the time of maintaining the natural environment

SUMMARY OF THE INVENTION

The primary object of the present invention is to provide a construction for environmental protection in respect of water source and earth. The permeable hillsides constructed according to the invention can drainage away the surplus water contained in the soil. Meanwhile, greening scenery may be created as well. The invention actually has a drainage fiction to prevent mudflow and landslide, and reduce the occurrence of greenhouse effect.

The secondary object of the invention is to provide a construction for environmental protection in respect of water source and earth. The permeable hillsides constructed according to the invention can allow a great quantity of weeds to grow thereon, thereby providing a place for fowl to rest and breed. Accordingly, the natal environment can be maintained, and subsequently the insect pest can be reduced.

To obtain the above objects, the invention includes combining water ducts, planting cases and a connecting mesh to form a frame. The duct ends of the frame are buried in the earth such that a plurality of frames can connect to each other and be fastened to the rock walls by way of earth anchors. The frames can be pre-fabricated with concrete after being covered by plugs and padded with moldboards. By way of the water ducts inserted in the earth, the rain absorbed by the hillside soil can be drained away to prevent mudflow and landslide. Meanwhile, the planting cases on the hillsides can contain soil for growing weeds to cover the factitious concrete walls, and present a natural grassplot. The invention not only has the drainage function to maintain the water source and earth, but also has the greening function.

BRIEF DESCRIPTIONS OF THE DRAWINGS

DETAILED DESCRIPTION OF THE EMBODIMENTS

Figure 1:
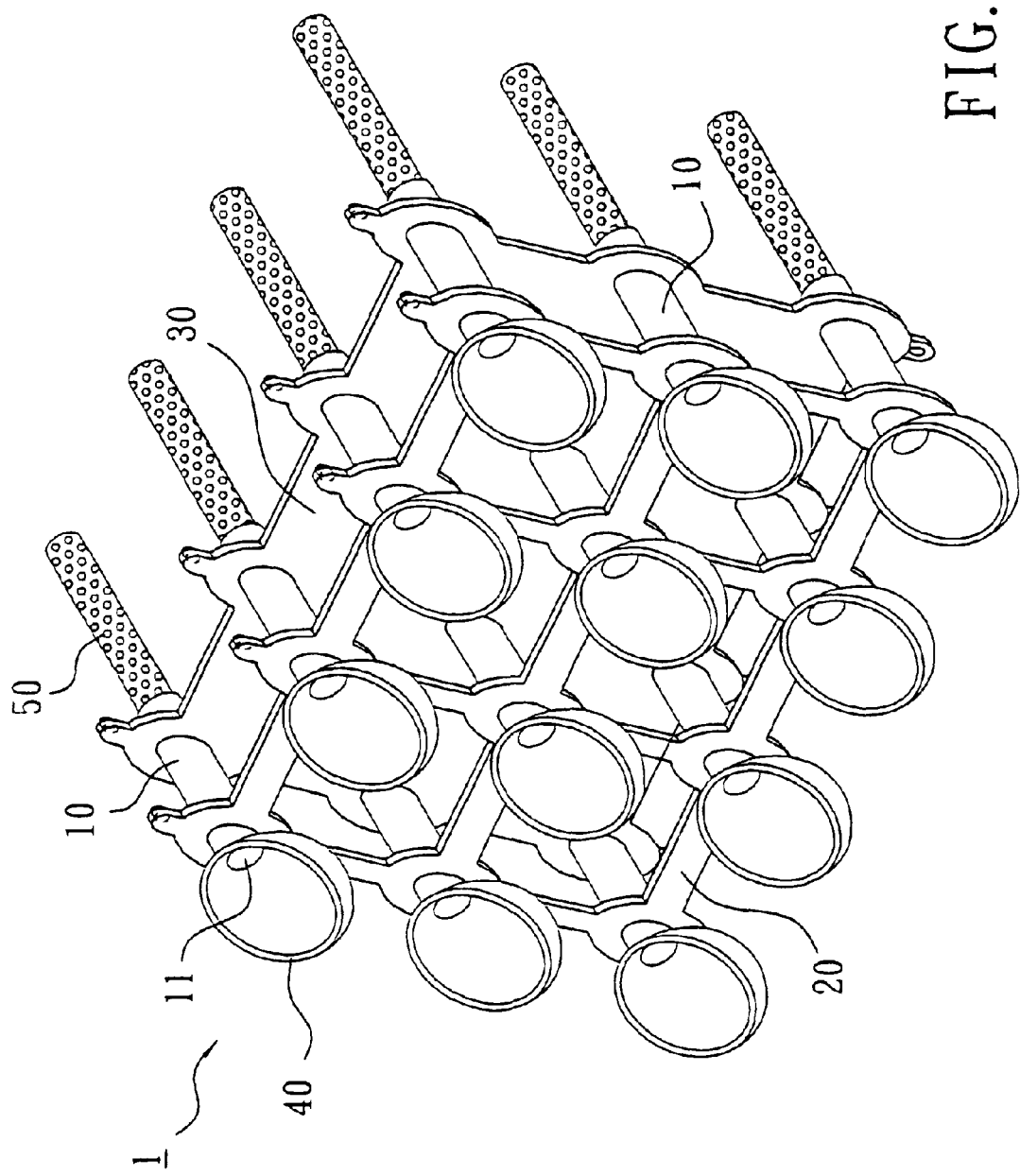
FIG. 1 is an exploded view of the fame according to the invention.

Referring to FIG. 1, an preferred embodiment of the invention is provided with a fire 1, which is composed of a plurality of water ducts 10, a connecting mesh 20, a lower moldboard 30 and a plurality of planting cases 40 connected to the end of the water ducts.

Figure 5:
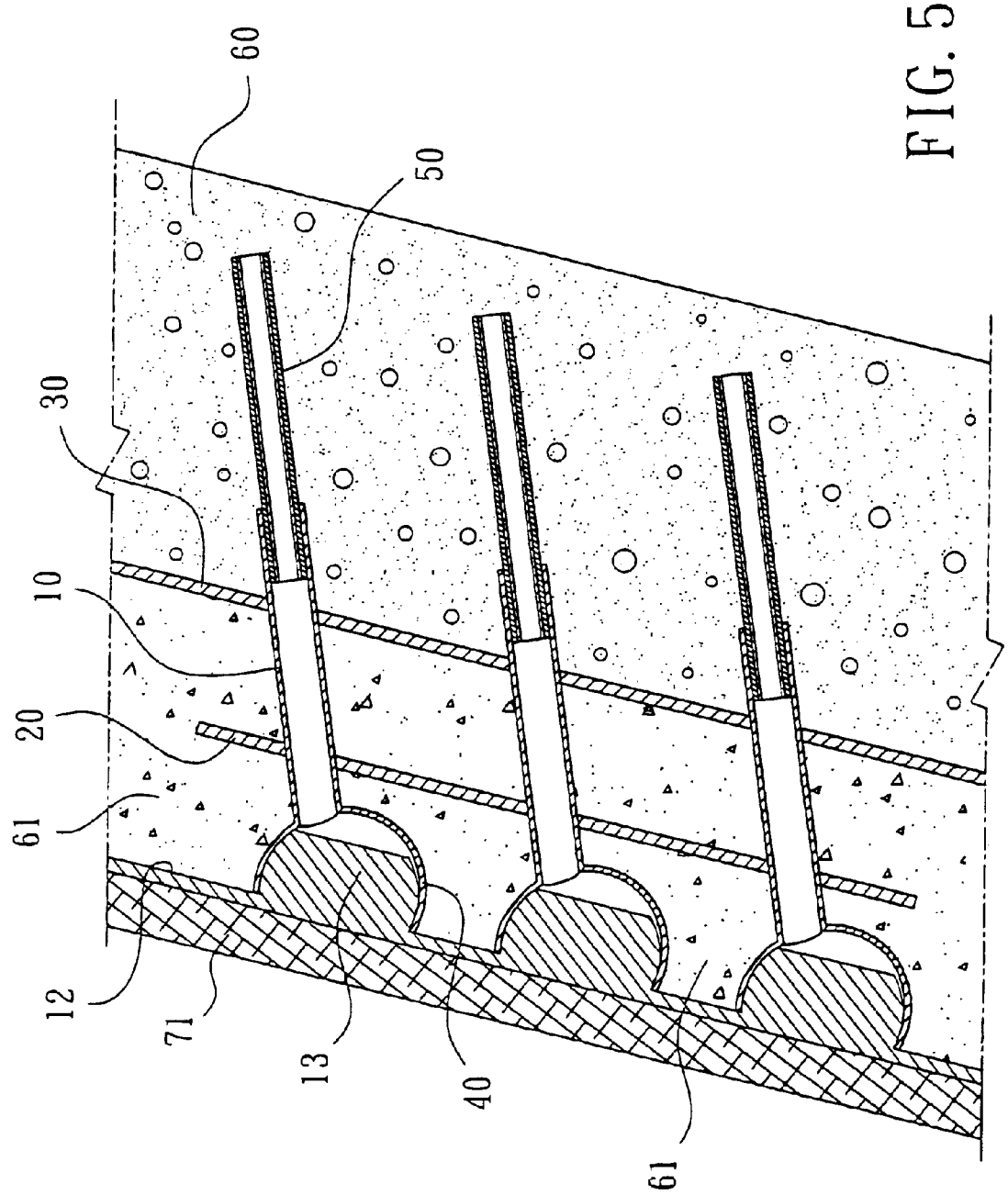
FIG. 5 is a cross-sectional view of the construction including the covering mold panel and the padding moldboard.
Figure 6:
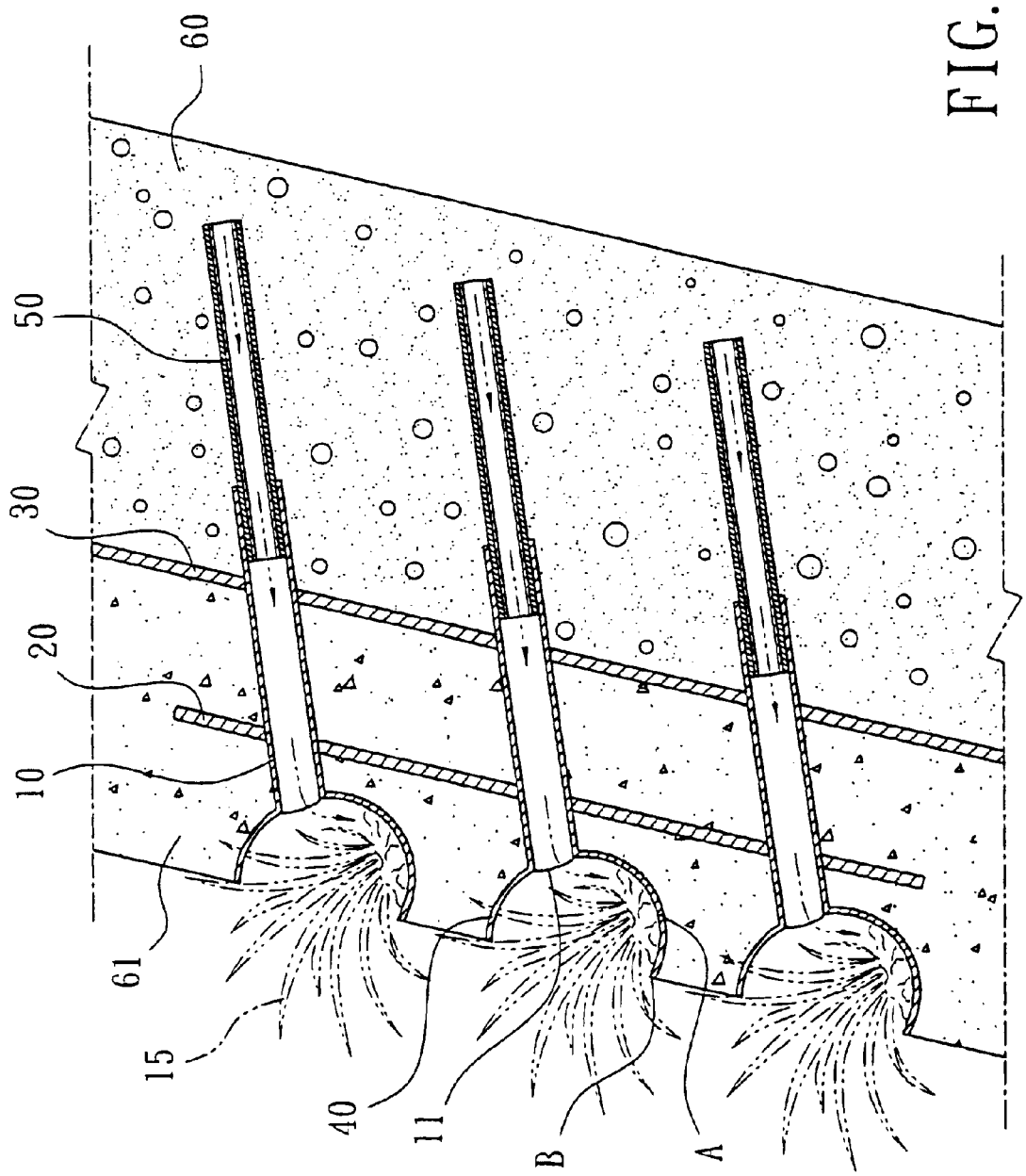
FIG. 6 is a cross-sectional view of the construction including the hillside permeable paving.

The rear end of the water duct 10 extends a length in order to be inserted into the soil and is further connected to a long drainpipe 50 for extending a longer distance adapted to be inserted and buried in the hillside soil 60 (as shown in FIGS. 5 and 6).

Figure 2:
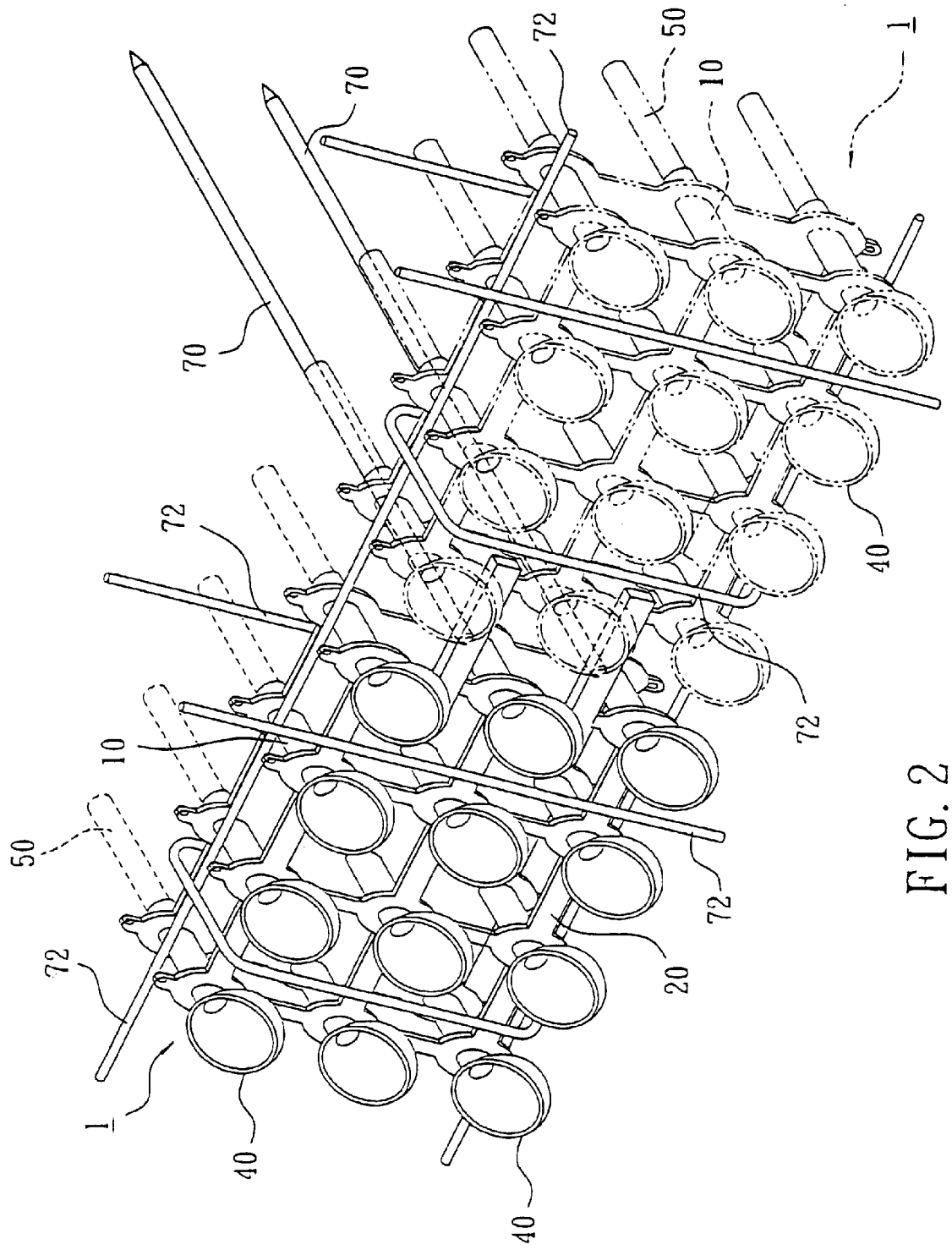
FIG. 2 shows that the frames are combined with the earth anchors for fastening to the hillsides.

Referring to FIG. 2, when the permeable wall is to be constructed on a hillside with inclination, the plurality of frames 1 can be combined together and hammered into the rock wall by way of earth anchors 70. Alternatively, the frames 1 can be combined with reinforcing steel bars 72 and grouted with concrete to harden the structure.

Figure 3:
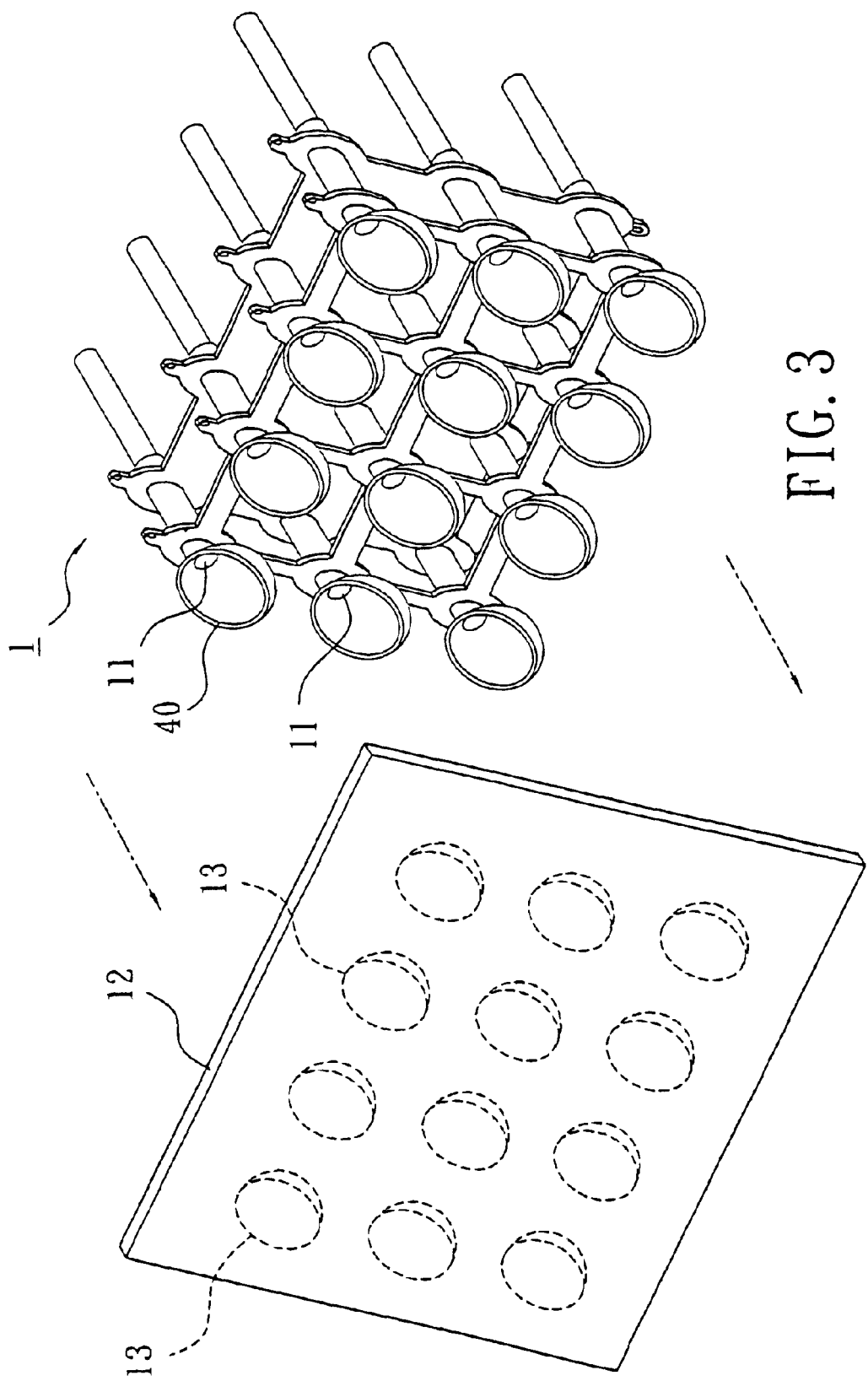
FIG. 3 shows that the frame is covered by a mold panel.
Figure 4:
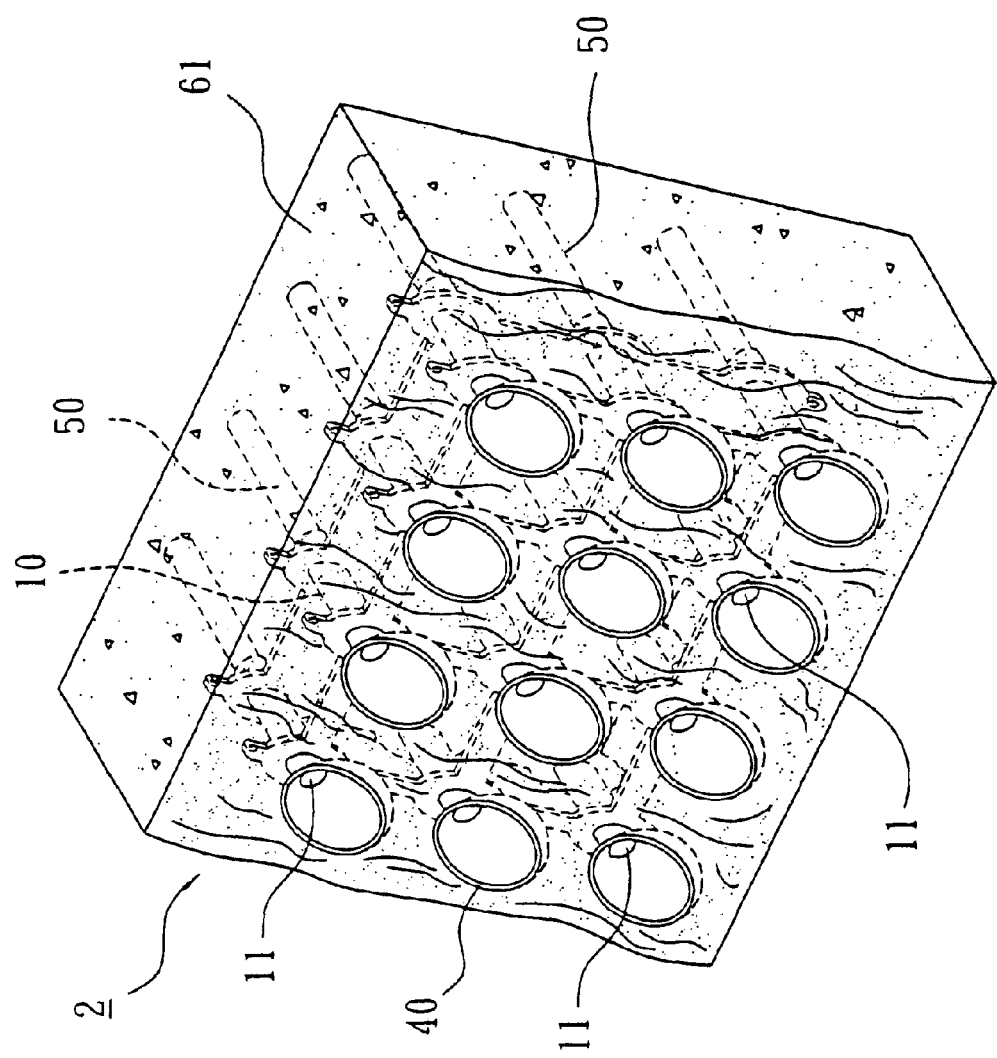
FIG. 4 is an exploded view showing the application of the invention to the hillside.

Referring to FIGS. 3 and 4, after the frames 1 are fastened to the hillsides by way of earth anchors 70, mold panels 12 may be provided to cover on the planting cases 40 of the frames. The mold panel 12 maybe integrally formed with the padding moldboard 71 before grouting, so as to prevent the water ducts 10 from being stuck. The surface of each covering mold panel 12 may provided with a plurality of extruding plugs 13, which will be removed from the top of the water ducts 10 (as shown in FIG. 4) after the prefabrication is completed, thereby displaying the water outlets 11.

Note that the purpose of provision of the covering mold panels 12 provided with plugs 13 is to accelerate removing of the plugs 13 along with the mold panels. Alternatively, it is applicable to fill the planting cases 40 one by one with any filling (such as Styrofoam, fabric, empty case, etc.), and pick off the filling after detaching the moldboard 71.

FIG. 4 shows a cross-sectional view of the frames 1 constructed on the hillsides and solidified with concrete 61 grouted thereon. While a hard concrete wall 2 is formed, it appears to have planting cases 40 and pipe heads 11. The drainpipes 50 are provided deep inside of the earth for the purposes of draining out of water.

Referring to FIG. 5, after the plurality of frames 1 and earth anchors 70 are positioned and fastened in the hillside, planting cases 40 are covered by a covering mold panel 12. While a moldboard 71 is fastened to the outside of the covering mold panel 12, the frames 1 are padded by a lower moldboard 30 and covered by the moldboard 71 for position purposes at the time of grouting. The covering mold panel 13 and the moldboard 71 can be provided separately or integrally only if they can serve the purposes of covering the planting cases and padding the frames.

FIG. 6 is a cross-sectional view of the construction of the permeable hillside according to the invention. When constructing the frames 1 on the hillside, it is worth a consideration that the bottom A of the planting case 40 must be in a position lower than that of the pipe head 11 of the drainpipe 10, and that the overflow B of the planting case 40 must be in a position higher than the bottom A of the planting case 40. As such, the bottom A of the planting case 40 can contain soil for the growth of the weeds 15, thereby greening and beautifying the hillsides.

The bottom A of the planting case 40 must be in a position lower than the pipe head 11 of the drainpipe 10 such that when the hillside soil 60 is full of rain, the surplus water can be drain away by way of drainpipes 50 and water ducts 10. In the other way, even there is a heavy rain, the rain filling in the planting cases would not flow into the soil stratum along the water ducts 10.

Figure 7:
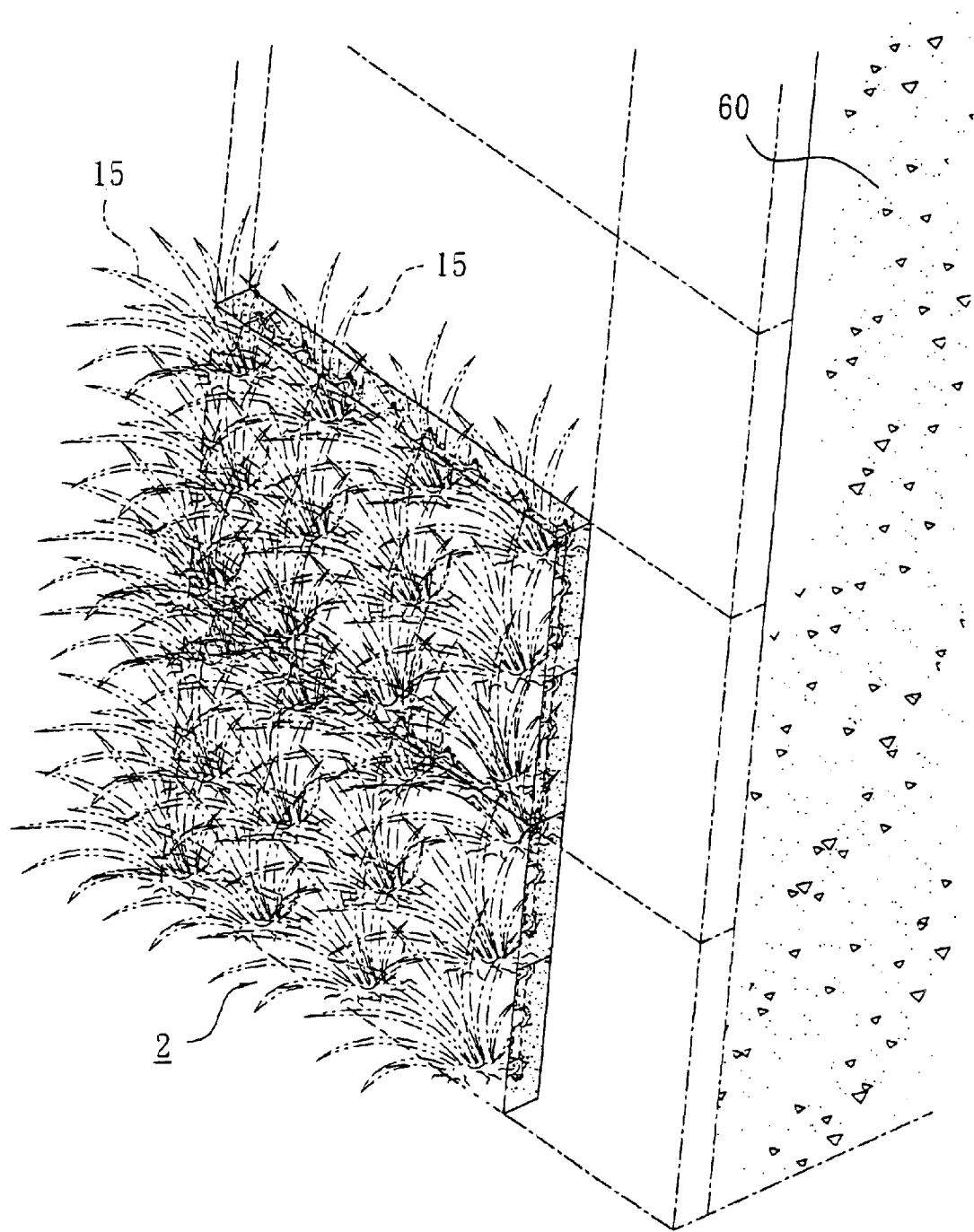
FIG. 7 shows the hillside permeable paving according to the invention after completion.

Referring to FIG. 7, while the permeable component blocks 2 are paved on the hillsides, they can drain away the surplus water contained in the soil. Besides, regarding the outer appearance of the hillside, after a period of time, weeds 15 would naturally grow from the planting cases 40 containing soil, and gradually cover the planting cases 40 and water ducts 11. The hillside constructed according to the invention can create natural scenery and provide a place for fowl to rest and breed, achieving a great contribution to the environment.

Figure 8:
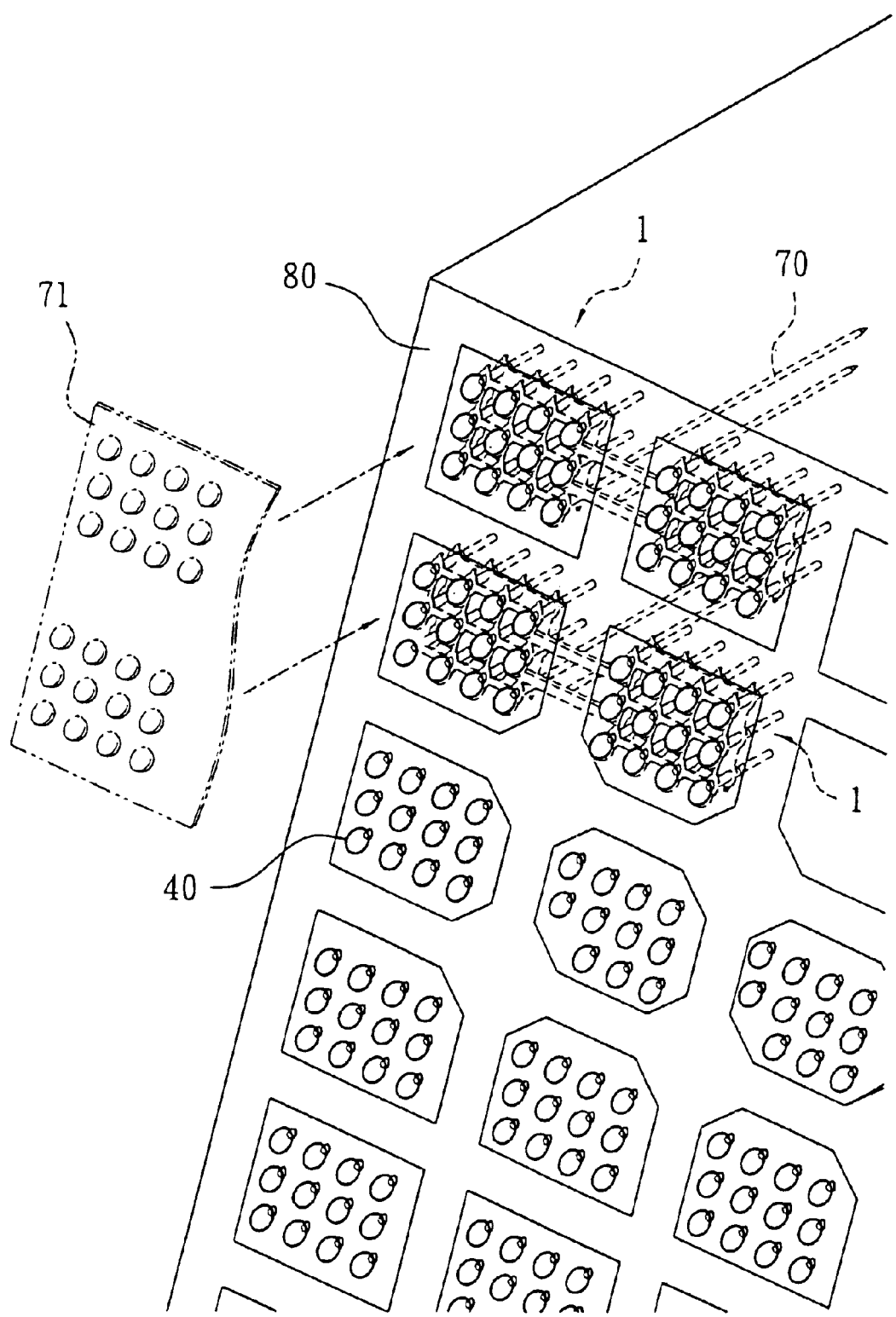
FIG. 8 shows application of the invention to integrally form the retaining wall.

Referring to FIG. 8, in another preferred embodiment of the invention, the permeable paving and the latticed retaining walls 80 may be used in combination. A plurality of frames 1 are fastened to the hillside by way of earth anchors 70. Padding moldboards 71 seal up the outside of the frames 1, both of which can be grouted with concrete to integrally form a concrete wall. A plurality of planting cases 40 are provided on the wall which appears to be latticed retaining walls 80, thereby the construction can serve as environmental protection in respect of water source and earth, as well as drainage and greening purposes.

Figure 9:
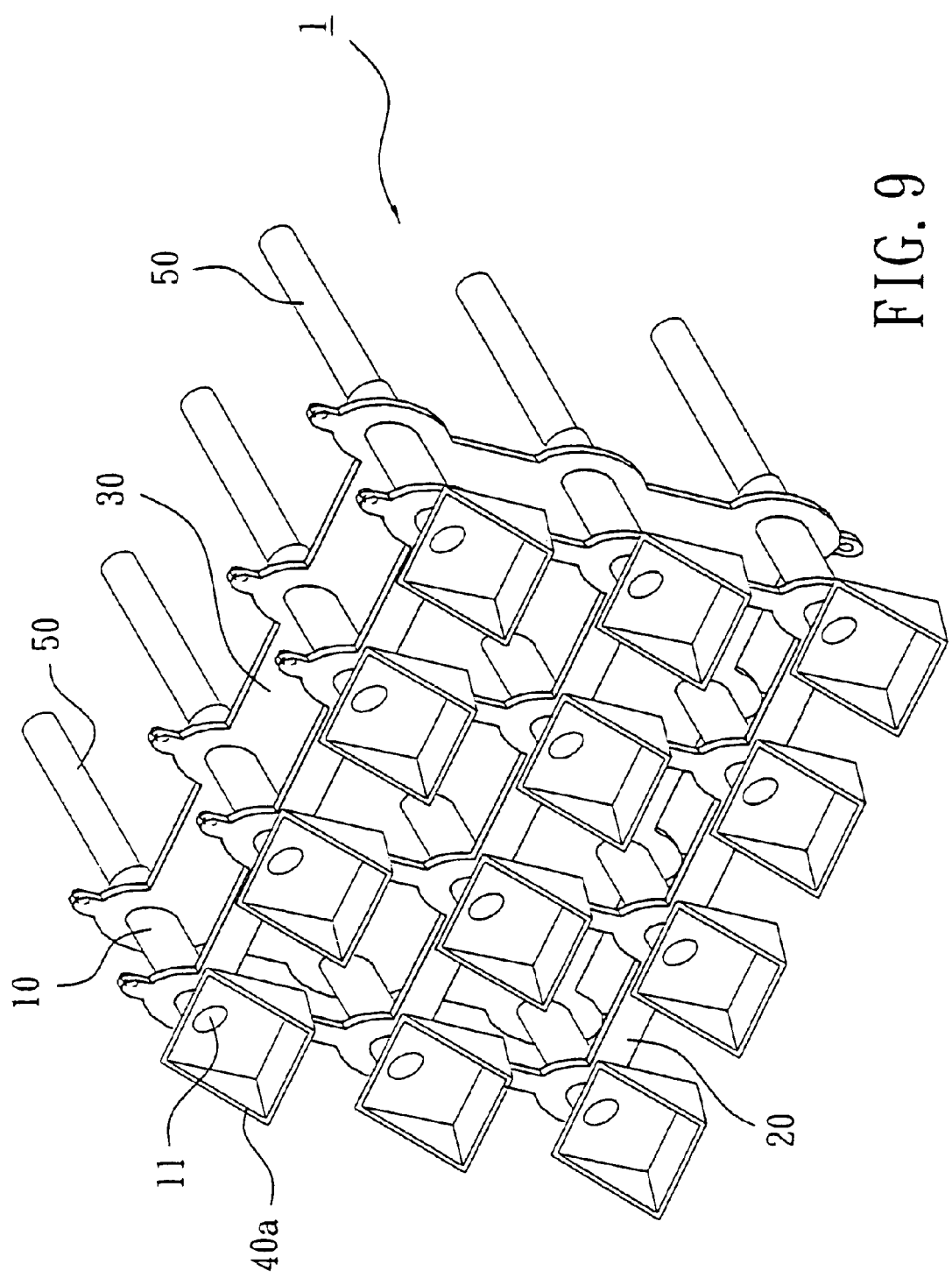
FIG. 9 is an exploded view of another preferred embodiment containing the planting cases.

As shown in FIG. 9, as planting cases 40 are provided on the frames 1, they may serve as a mean of planting. The planting cases 40a as shown present a square shape, allowing a different view of the hillsides. Planting case of any outline easing production and mold detaching can be utilized.

Figure 10:
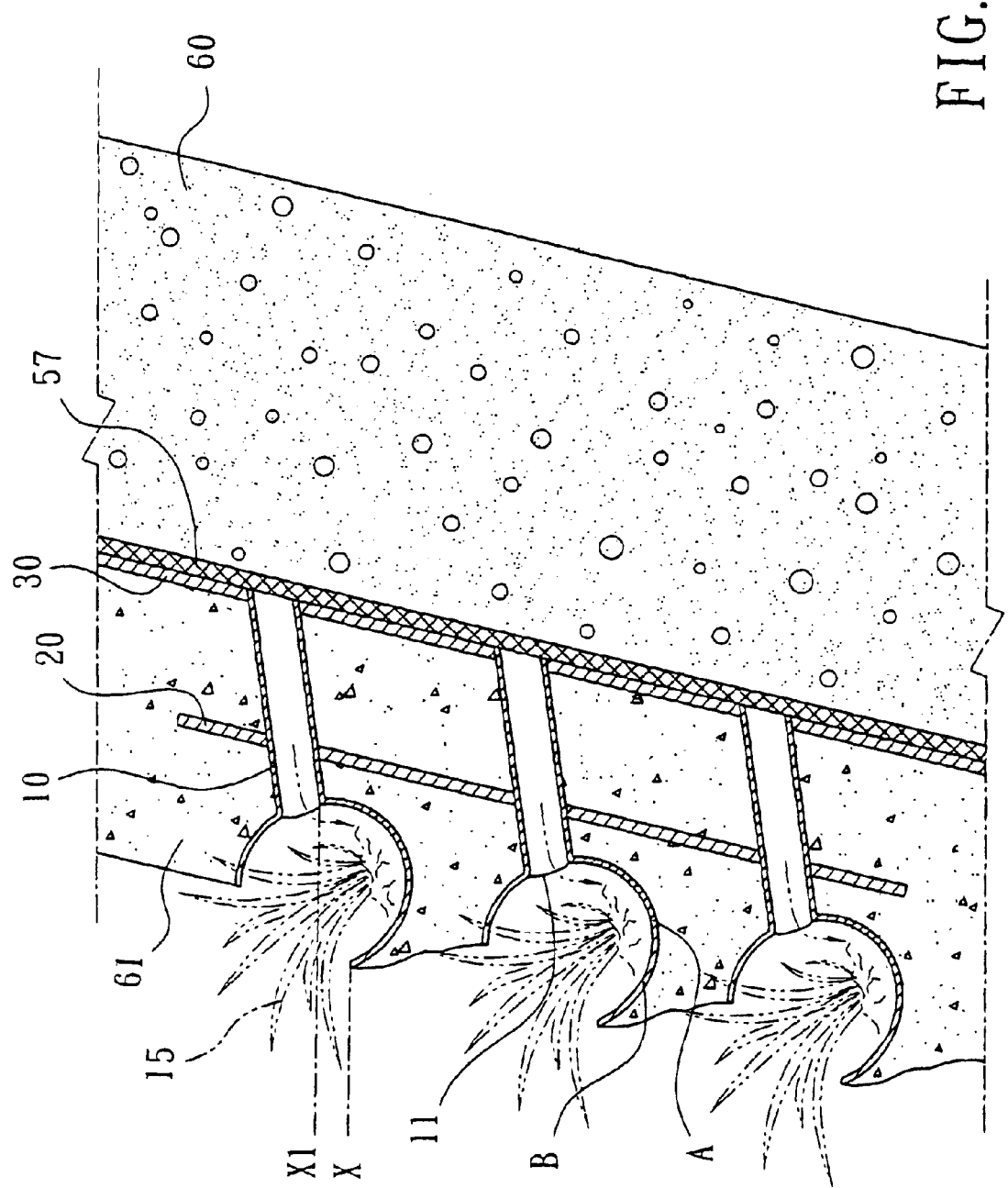
FIG. 10 is a cross-sectional view of another embodiment, showing the provision of a sand screen cloth at the end of the frames.

FIG. 10 shows another preferred embodiment of the invention, wherein the water duct 10 is provided without connecting to a drainpipe at the end. Instead, a sand screen cloth 57 is provided, which can also serve the purposes of drawing water, to prevent sand from sticking in the water ducts 10.

Figure 11:
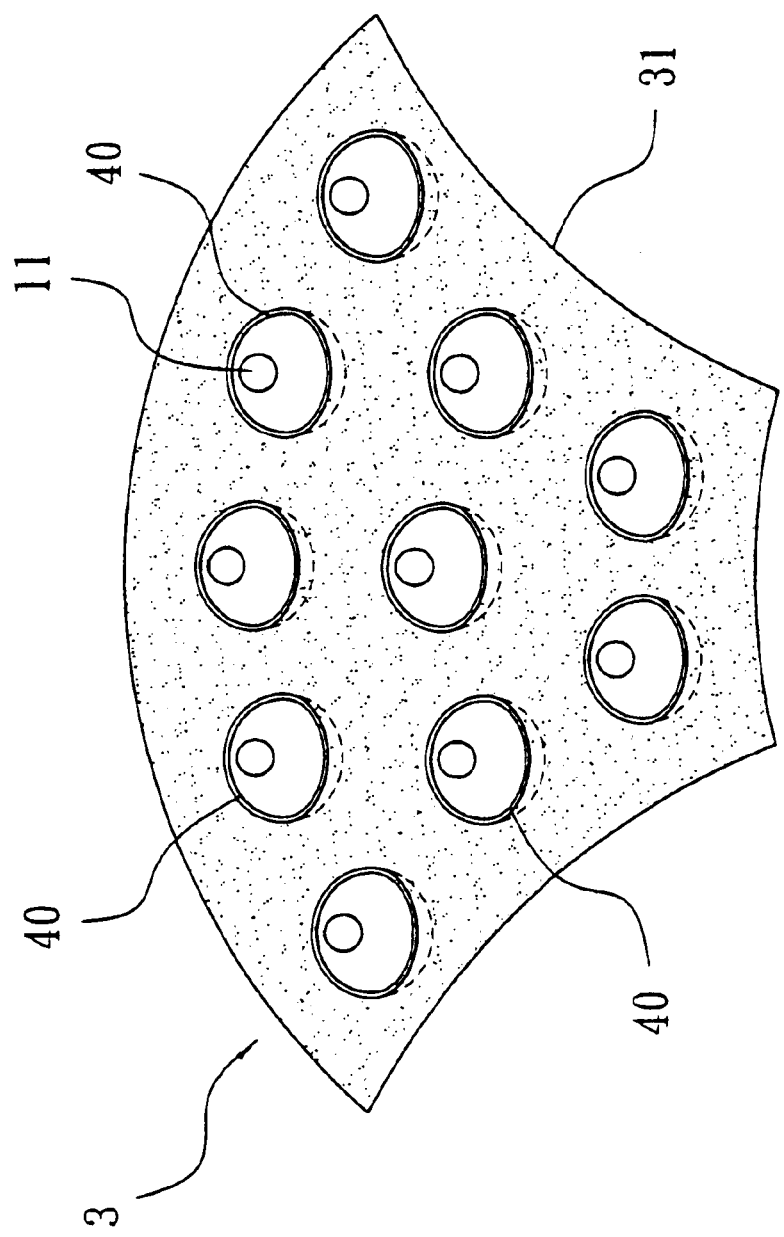
FIG. 11 shows the pre-fabricated board

In FIG. 11, the planting cases 40 on the frames are arranged in an irregular way, appearing a very different style. The pre-fabricated board 3 may have a special outline 31 only if it is adapted to be pieced together with each other.

Figure 12:
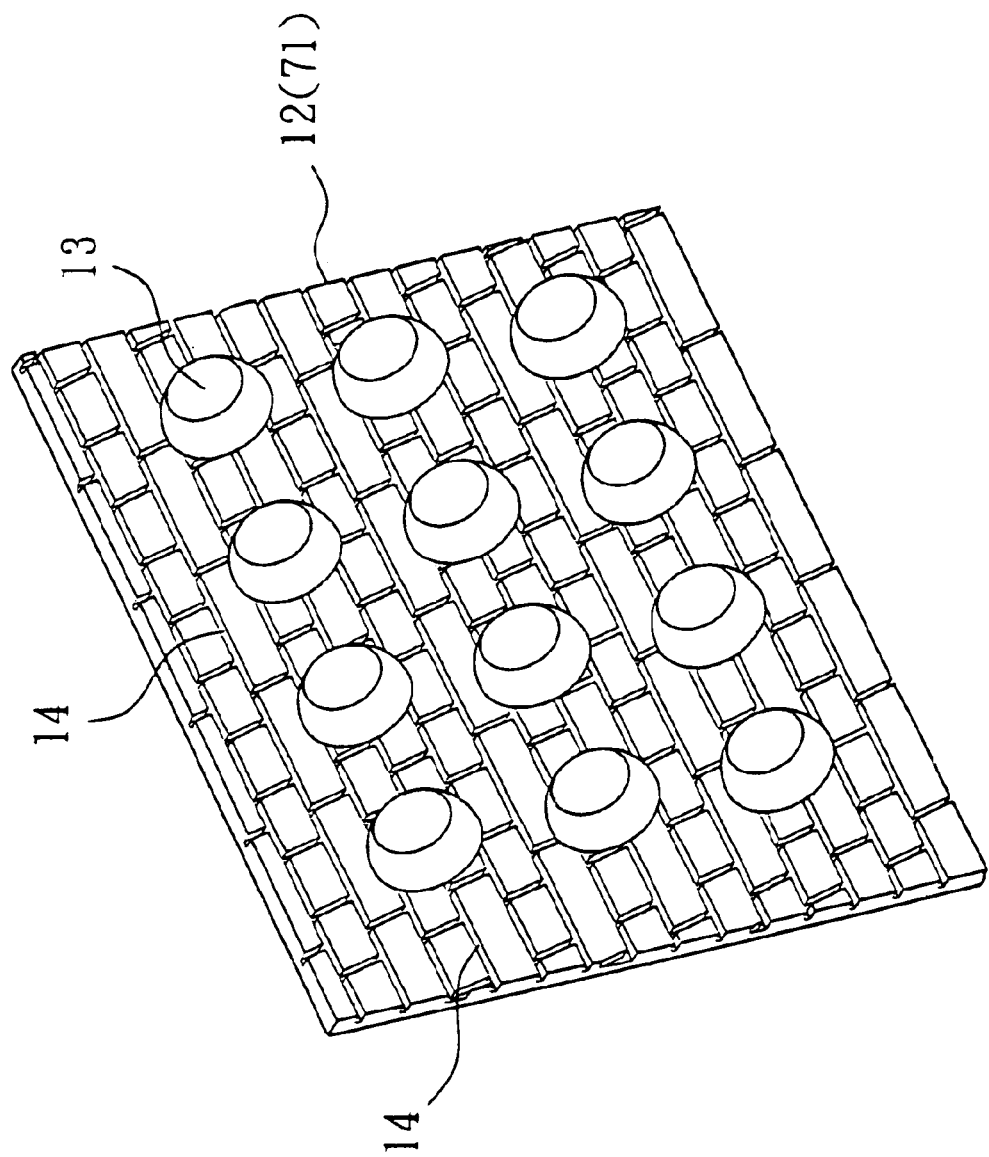
FIG. 12 shows another preferred embodiment containing the covering mold panel.

Referring to FIG. 12, to form lines on the constructed wall, brick interstice lines can be provided on the surface of the covering mold panel 12 (or integrally formed moldboard 71 with plugs), such that the plugs 13 extruding from the covering mold panel 12 can plug and be fastened to the planting cases 40, while the brick interstice lines 14 can be printed on the surface of the boards 2.

Figure 13:
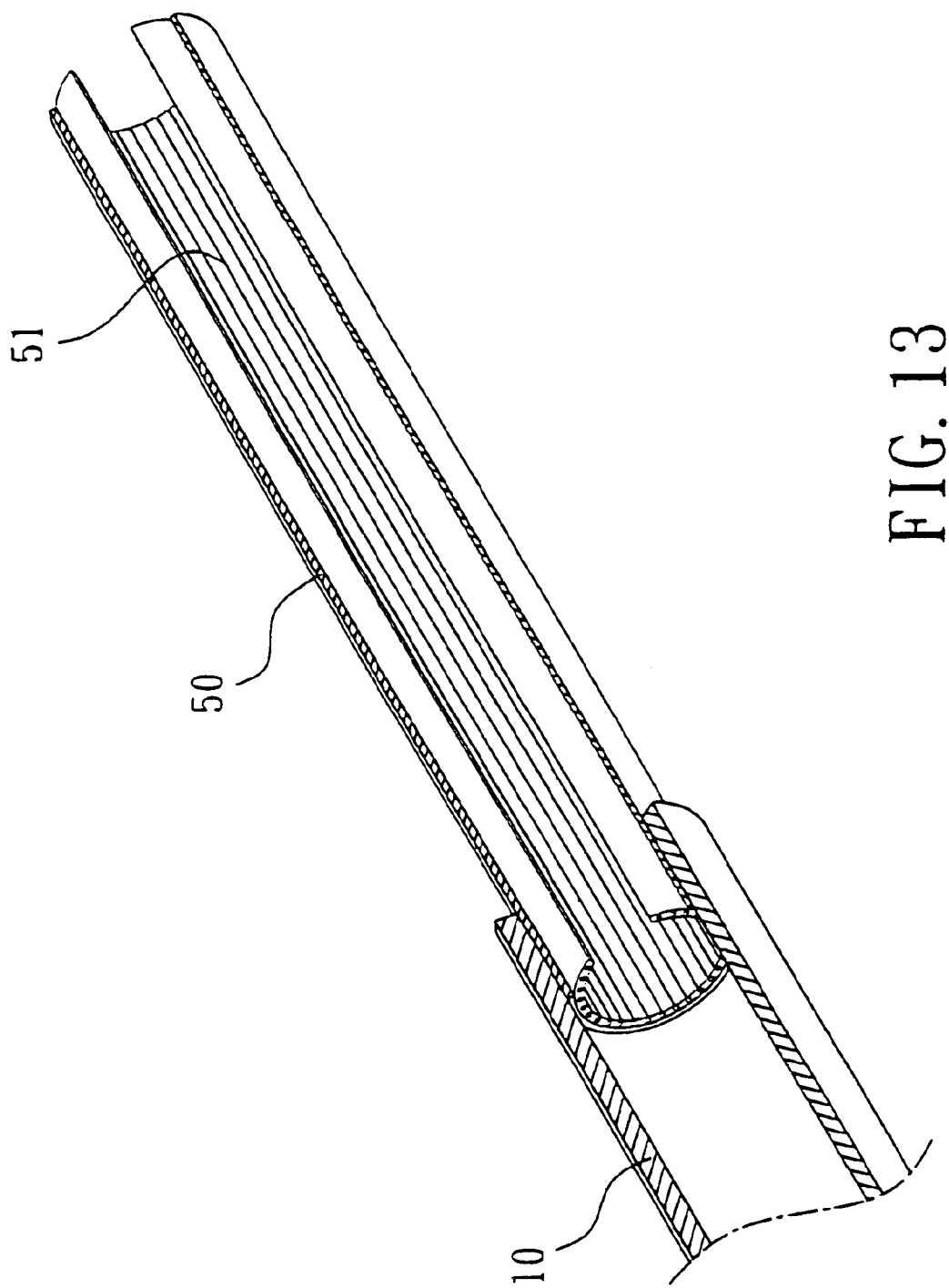
FIG. 13 shows the water duct of the invention connected to a drainpipe at its rear end.
Figure 14:
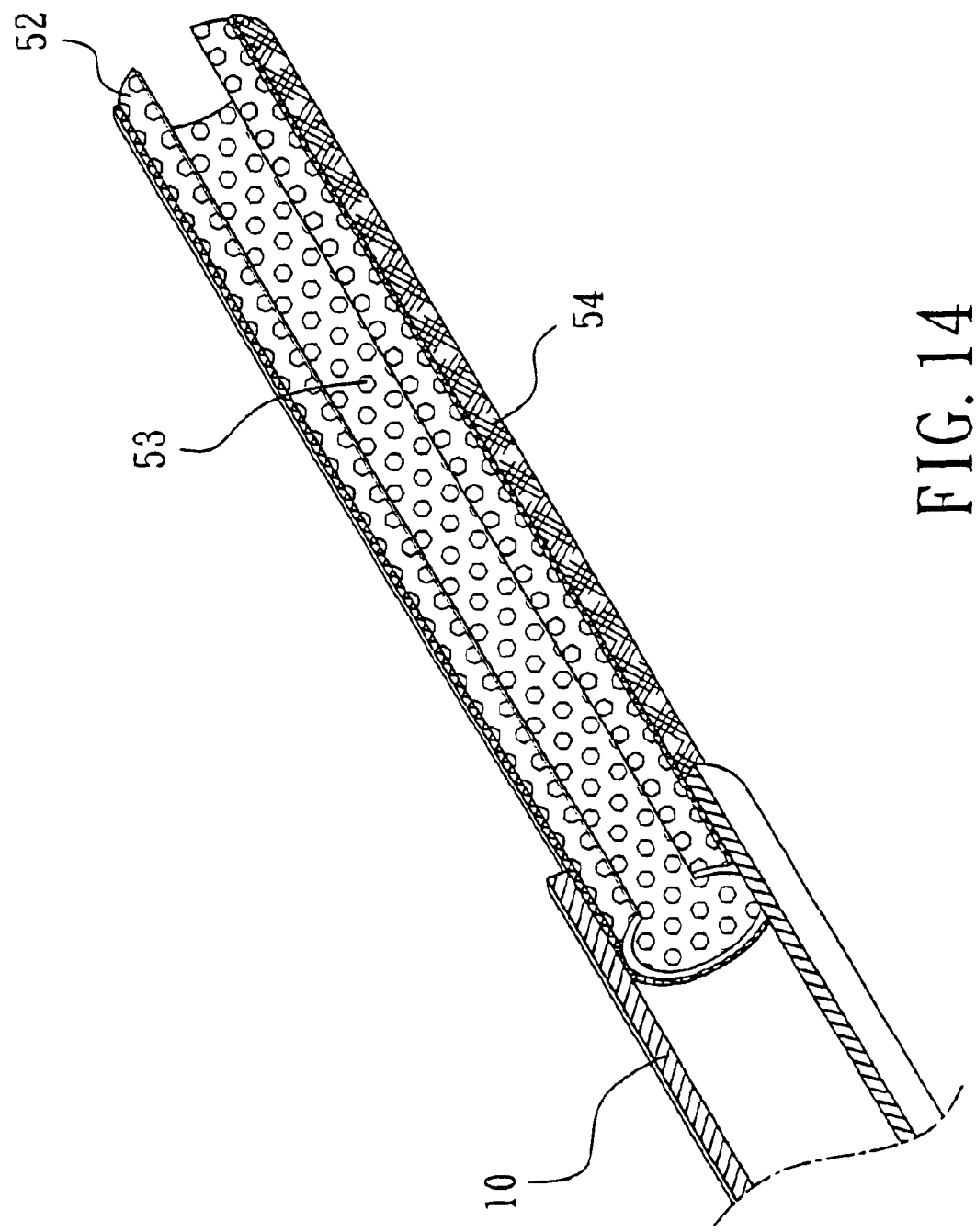
FIG. 14 shows the water duct of the invention connected to the drainpipe along with a sand screen non-woven fabric at its rear end.
Figure 15:
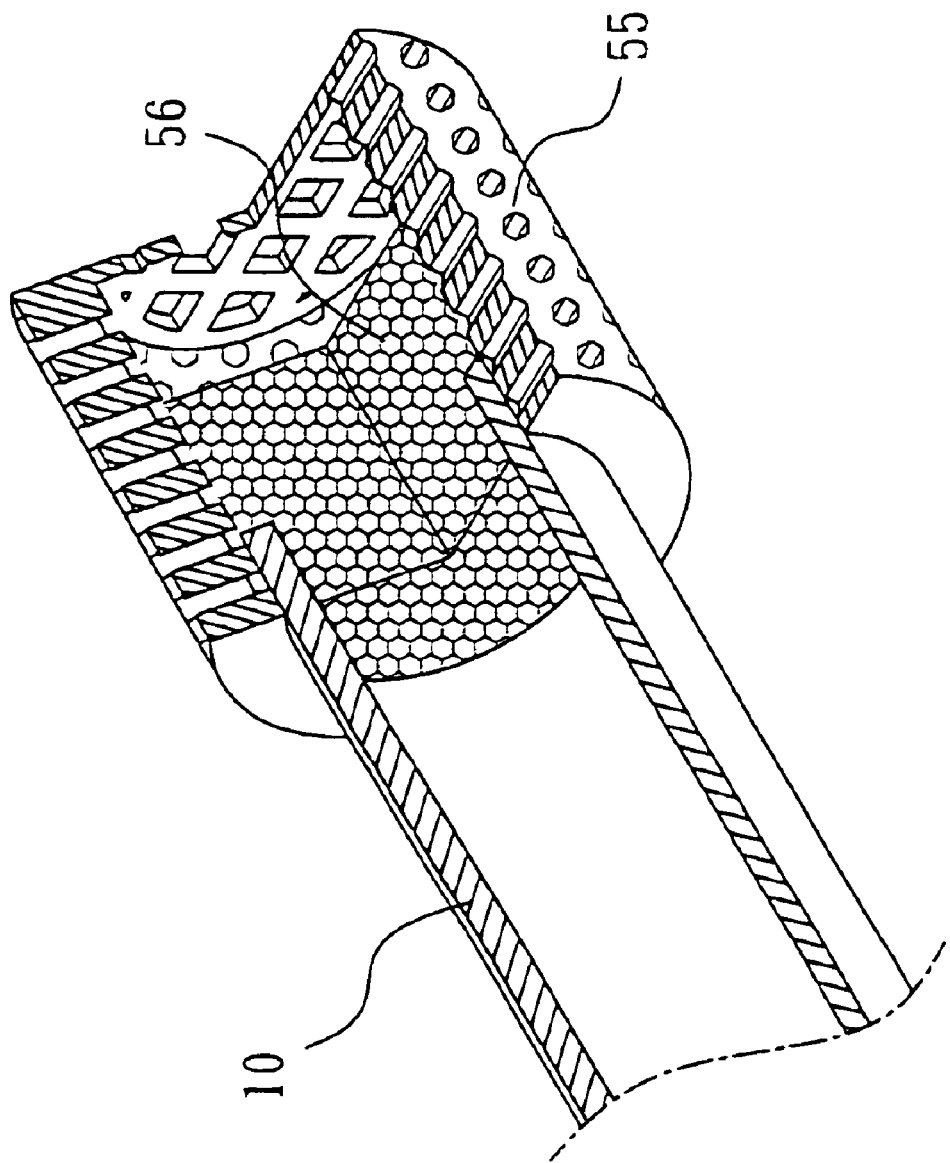
FIG. 15 shows the water duct of the invention connected to a water inlet at its rear end.

Referring to FIGS. 13 to 15, in one preferred embodiment of the invention, the water duct 10 can be connected with a good drainpipe (drainage belt) 50 at the end. Scraggy capillary surfaces 51 can be provided on the interior surface of the drainpipe (drainage belt) 50 (as shown in FIG. 13). Alternatively, the drainpipe 52 can be drilled to form apertures 53 and covered by a permeable sand screen non-woven fabric 54 (as shown in FIG. 14), such that water can permeate through thereto and the drainpipe 54 will not be stuck by accumulated sand. In case the water ducts 10 are not to extend to a great depth, a water inlet 55, preferably being inserted with a filtering element 56 for sand screen purposed, can be mounted on the end of the water ducts 10.

Figure 16:
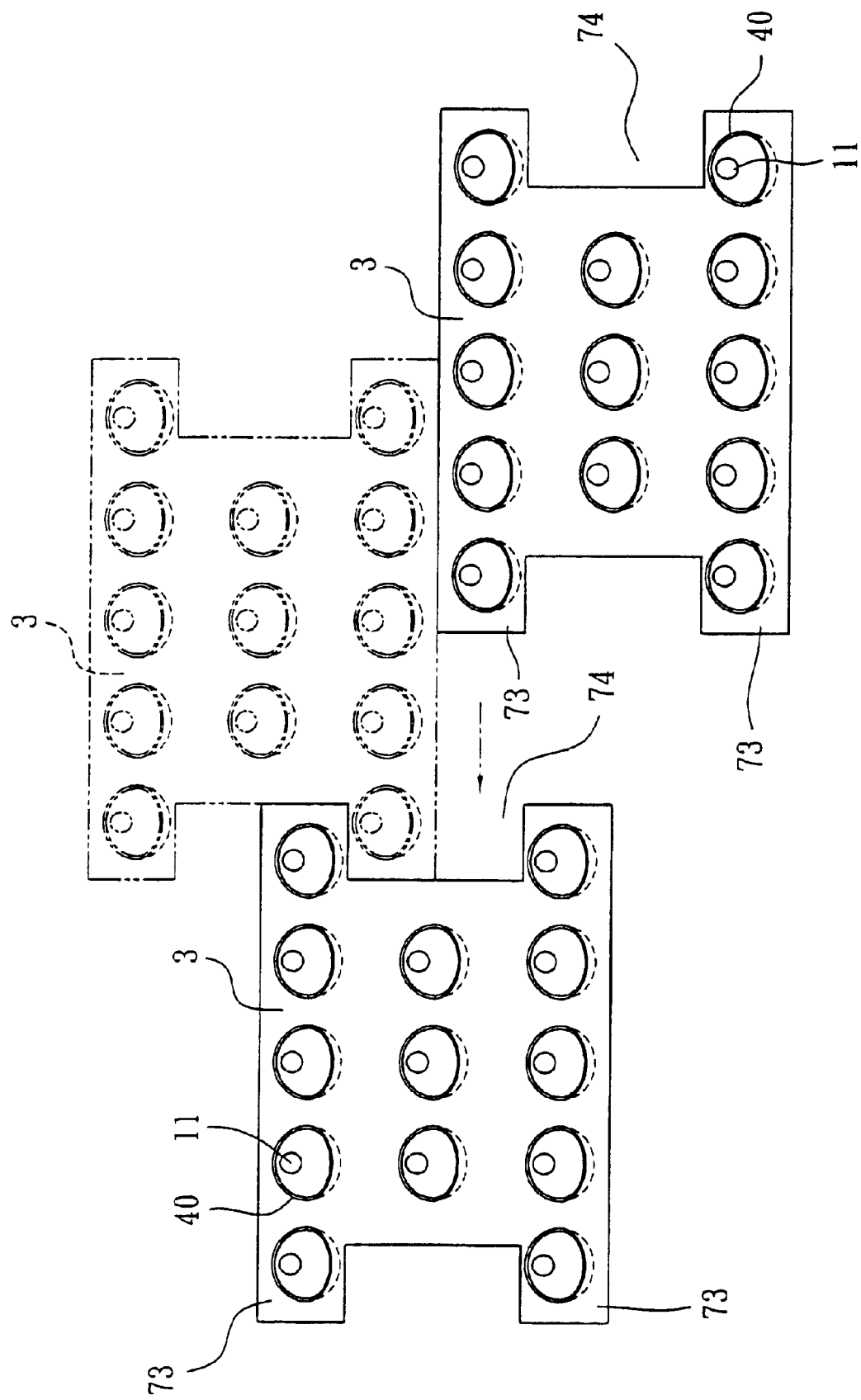
FIG. 16 shows the combination of the pre-fabricated boards.

Referring to FIG. 16 for another preferred embodiment of the invention, extruding pins 73 and grooves 74 can be provided on the boards 3 such that when piecing the boards 3 together, these extruding pins 73 and grooves 74 can serve the purposes of positioning and fastening.

Figure 17:
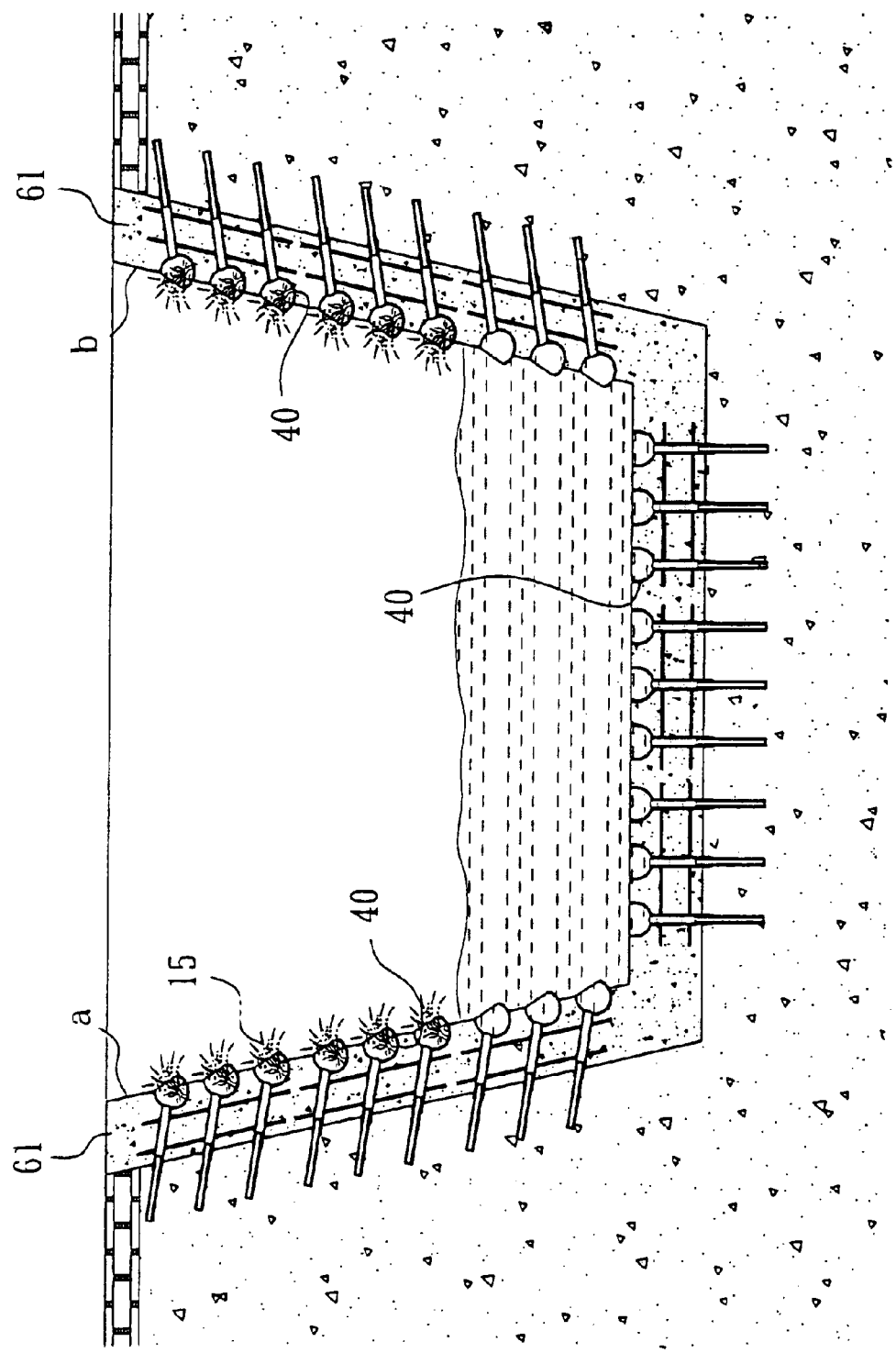
FIG. 17 is a cross-sectional view showing the application of the invention to an escape canal.

FIG. 17 shows a cross-sectional view of invention constructed on an escape canal. While the paving for environmental protection in respect of water source and earth constructed according to the invention may be applicable to hillsides (a, b), in view of the provision of the planting cases 40, plants can grow on the planting cases 40 for greening and beautifying purposes. For example, when applying the invention to a trench or stream way, in view of the provision of the planting cases 40, the walls of the trench or stream way will appear a smooth surface, thereby slowing down the rushing water, as is the function of the extruding pebbles provided on the river sides. Meanwhile, each water duct 10 can successfully drain out the water contained in the soil, in order to prevent mudflow, and solve the issue of greenhouse effect as well. As shown, the bottom of the trench can also be constructed with the permeable paving according to the invention, such that the water ducts 10 provided in the bottom of the trench can steep in the water for absorbing the surplus water (rain) to supplement the underground water.

Figure 18:
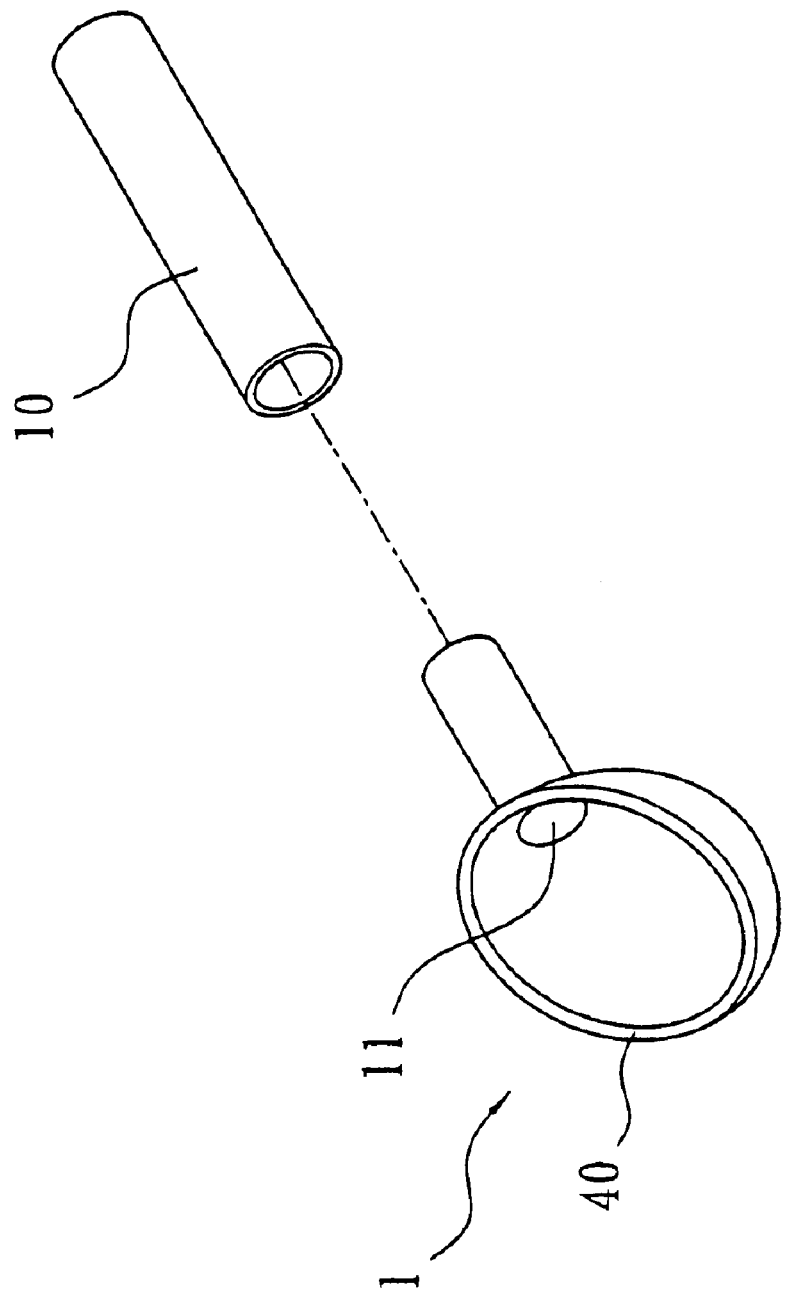
FIG. 18 shows the combination of the planting case with the water ducts according to another embodiment.

FIG. 18 is an exploded view of another preferred embodiment of the invention, the planting cases 40 and the water duct 10 after combination have the same application and function as afore-mentioned.

Figure 19:
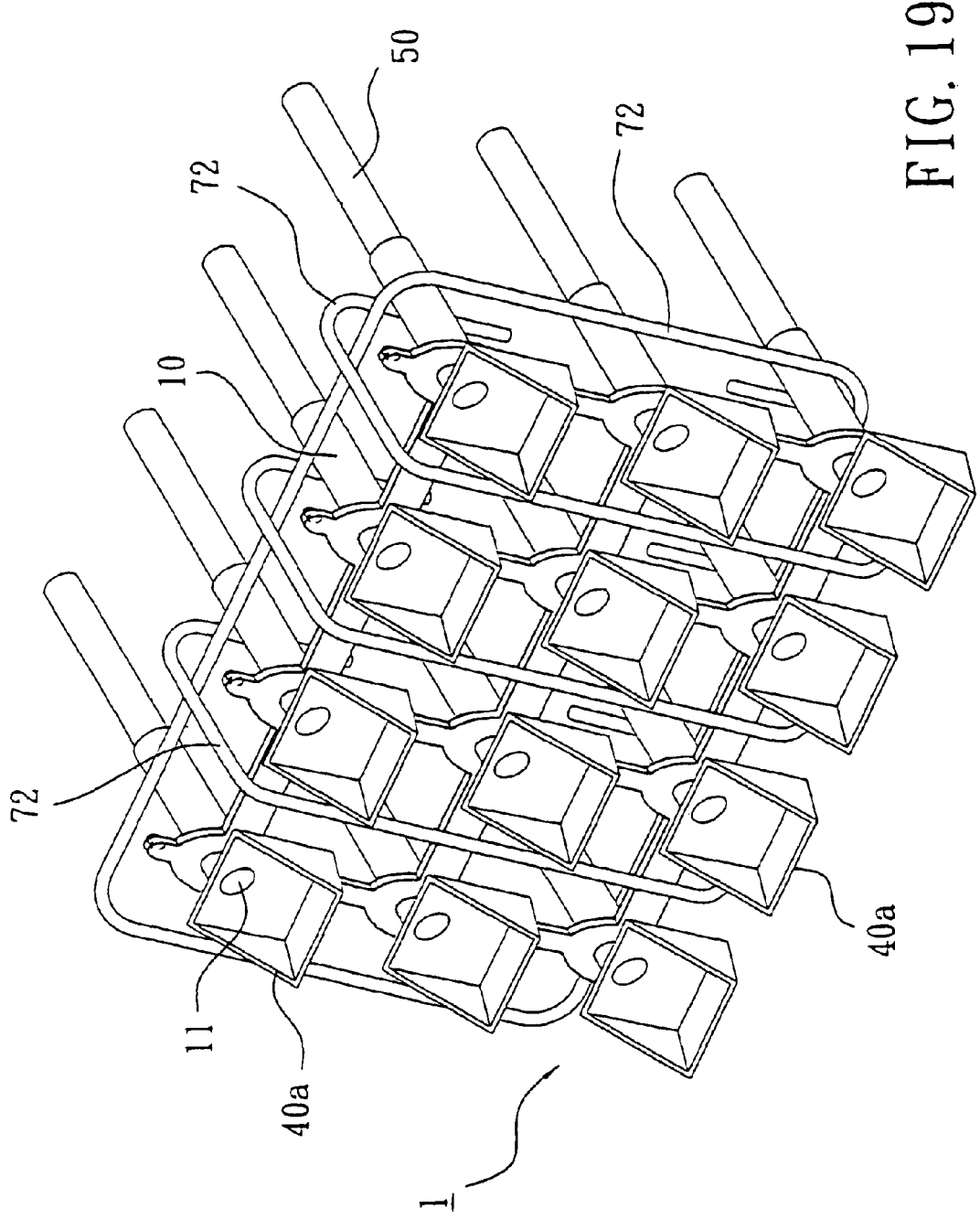
FIG. 19 is a perspective view of another embodiment, wherein the frame can be pre-fabricated with the reinforcing steel bars directly added thereto.
Figure 20:
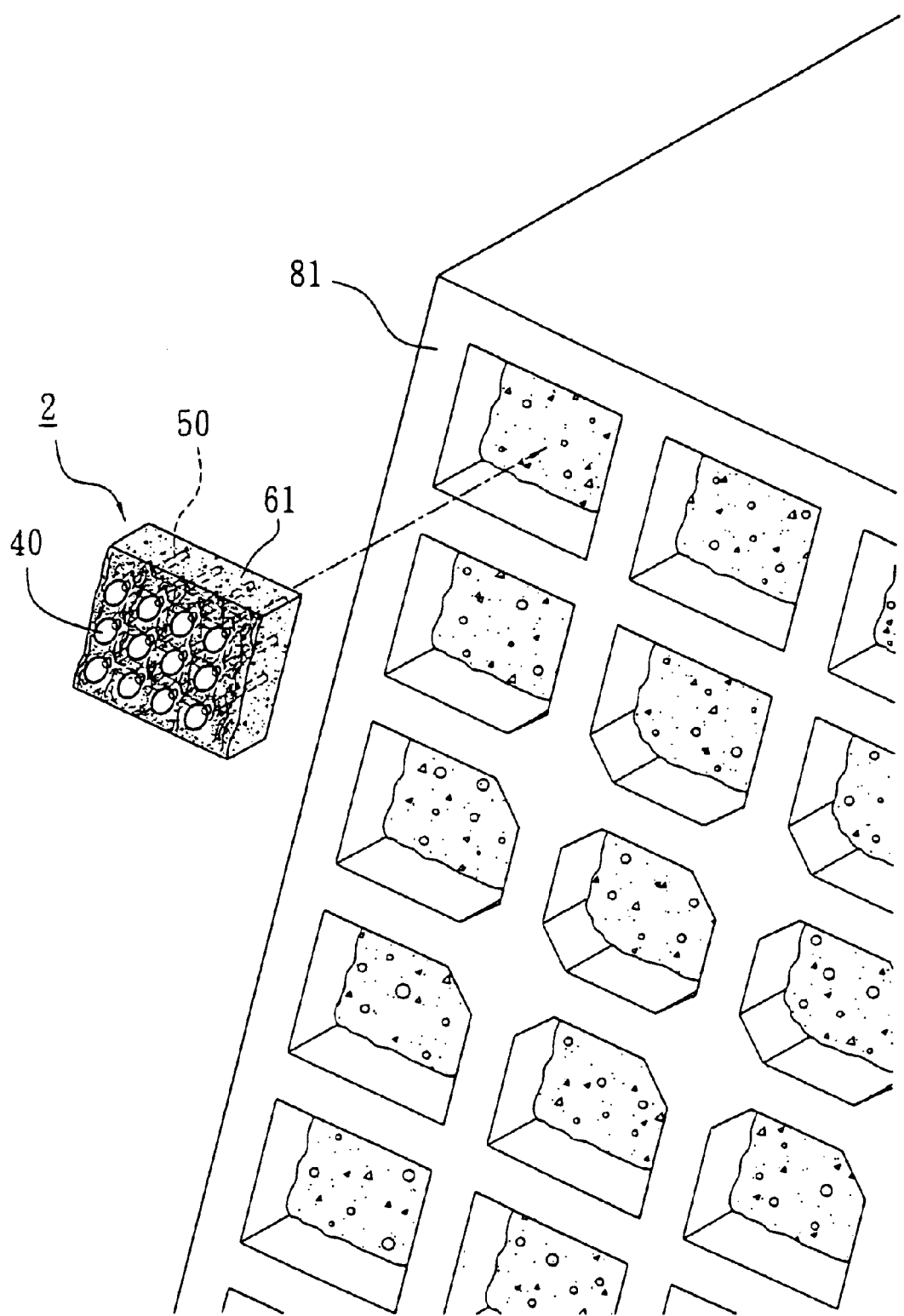
FIG. 20 shows the application of the invention, wherein the pre-fabricated board is inserted into the latticed retaining wall.

Referring to FIGS. 19 and 20, when combining the frames 1, reinforcing steel bars 72 can be mounted on the frames 1. The frames are disposed in a mold (not shown), and grouted with liquid concrete 61 or concrete with any recycled material (such as incinerator ash) to form a pre-fabricated board 2 (as shown in FIG. 20). The boards 2 can be inserted in a latticed retaining wall 81 to prevent from mudflow and landslide. Meanwhile, planting cases 40 can contain soil for growing plants to obtain a beautiful view.

Water ducts 10 and drainpipes 50 stretch out of the back of the board 50, such that a certain bevel is retained between each water duct and the board (as shown in FIGS. 5 and 6).

Concluded above, the construction for environmental protection in respect of water source and earth can allow a certain bevel is retained between each water duct and the paving concrete board, in order to be applicable to hillsides. The invention has excellent function in permeably maintaining the water source and earth, beautifying view, and preventing mudflow and landslide. In view of the novelty and environmental concept embraced by the present invention, as well as the value applicable to the relevant field, the inventor claims the invention as specified in the following claims.

I claim:

1. A construction for environmental protection in respect of water source and earth, including the following steps:

(a) combining water ducts and a connecting mesh to form a frame, and subsequently combining a plurality of frames together into a great area of framework for fastening onto the hillsides;

(b) burring an end of the water ducts of the frames in the soil of the hillsides, the frames are covered by moldboards for fastening purposes;

(c) pouring liquid concrete onto the frames such that the liquid concrete will become solidified to form a concrete wall and that the frames are buried therein; and (d) detaching the moldboards from the frames to appear a plurality of planting cases on the hillside walls.

2. The construction for environmental protection in respect of water source and earth according to claim 1, wherein the plurality of frames can be fastened to the rock walls by way of earth anchors.

3. The construction for environmental protection in respect of water source and earth according to claim 1, wherein each frame is composed of water ducts, planting cases, a connecting mesh and moldboard(s).

4. The construction for environmental protection in respect of water source and earth according to claim 1, wherein reinforcing steel bars can be further bound to the frames.

5. The construction for environmental protection in respect of water source and earth according to claim 1, wherein the bottom of the planting case is in a position lower than that of the pipe head of the drainpipe, so is the overflow of the planting case.

6. The construction for environmental protection in respect of water source and earth according to claim 1, wherein a covering mold panel can be integrally combined with the moldboard.

7. The construction for environmental protection in respect of water source and earth according to claim 6, wherein plugs are provided on the covering mold panels.

8. The construction for environmental protection in respect of water source and earth according to claim 1, wherein the rear end of the water duct can be connected to a drainpipe for extending to a long distance to be adapted to be buried and engaged into the hillside soil.

9. The construction for environmental protection in respect of water source and earth according to claim 8, wherein the interior wall of the drainpipe has a scraggy capillary surface.

10. The construction for environmental protection in respect of water source and earth according to claim 8, wherein the drainpipe can be provided with apertures and further covered by sand screen of permeable non-woven fabric.

11. The construction for environmental protection in respect of water source and earth according to claim 1, wherein the planting cases may optionally have various shapes.

12. The construction for environmental protection in respect of water source and earth according to claim 1, wherein the planting cases can be arranged in an irregular way.

13. The construction for environmental protection in respect of water source and earth according to claim 1, wherein the rear end of the water duct is mounted with a water inlet.

14. The construction for environmental protection in respect of water source and earth according to claim 1, wherein the read end of the water duct of the frame can be padded with a sand screen of permeable cloth for sticking purposes.

15. A construction for environmental protection in respect of water source and earth, including the steps of combining water ducts, planting cases and connecting mesh(es) to form a frame, which is pre-fabricated into component block by way of concrete; allowing a certain bevel between each water duct and concrete block; piecing a plurality of component blocks together on the hillsides, such that the planting cases may contain soil for the weeds to grow naturally therein, thereby maintaining the drainage function of the hillside soil, prevent mudflow and landslide, and create a beautiful landscape.

16. The construction for environmental protection in respect of water source and earth according to claim 15, wherein the frame further has a lower moldboard for connecting to the water ducts to prevent the concrete from sticking in the water ducts at the time of grouting.

\* \* \* \* \*